United States Patent [19]

Barthomeuf et al.

[11] Patent Number: 4,904,135
[45] Date of Patent: Feb. 27, 1990

[54] CONE EXPANSION WALL-PLUG

[75] Inventors: Jean-Paul Barthomeuf, Bourg de Peage; Gërard Revol, Chabeuil, both of France

[73] Assignee: Societe de Prospection et d'Inventions Techniques (S.P.I.T.), Bourg-les-Valence, France

[21] Appl. No.: 318,397

[22] Filed: Mar. 2, 1989

[30] Foreign Application Priority Data

Mar. 2, 1988 [FR] France .............................. 88 02599

[51] Int. Cl.[4] ............................................. F16B 13/06
[52] U.S. Cl. ....................................... 411/55; 411/57; 411/61
[58] Field of Search ....................... 411/55, 57, 60, 61, 411/63–65, 71–74

[56] References Cited

U.S. PATENT DOCUMENTS

| 1,305,000 | 5/1919 | Ogden | 411/72 X |
| 1,372,035 | 3/1921 | Ogden | 411/72 X |
| 1,460,557 | 7/1923 | Ogden | 411/65 |
| 1,474,980 | 11/1923 | Ogden | |
| 3,421,404 | 1/1969 | Jacobs | |
| 4,002,100 | 1/1977 | Bucheli | 411/61 |
| 4,753,559 | 6/1988 | Pentesco | 411/61 |

FOREIGN PATENT DOCUMENTS

| 3446158 | 6/1986 | Fed. Rep. of Germany | 411/57 |
| 2291400 | 6/1976 | France | |
| 2294354 | 7/1976 | France | |
| 569774 | 6/1945 | United Kingdom | |

Primary Examiner—Lloyd A. Gall
Attorney, Agent, or Firm—Schwartz & Weinrieb

[57] ABSTRACT

A cone expansion wall-plug is provided comprising a shank (1), a spacer (13) disposed about the shank, an expandable socket (4) and, at the end (5) of the shank (1), a cone (3) for expanding the socket (4). In order to be able to secure an object to be fixed against the edge of the anchorage hole formed within a supporting material for housing the wall-plug, the socket (4) includes a compressible zone (8) in the form of a bellows and bent lugs providing expansion and guiding teeth (10). The socket (4) is formed by die-stamping a metal sheet blank.

14 Claims, 1 Drawing Sheet

CONE EXPANSION WALL-PLUG

FIELD OF THE INVENTION

The present invention relates to a truncated cone expansion type wall-plug comprising a shank with, at one end thereof, a truncated cone adapted to be driven in translation by means of the shank so as to cause expansion of an expandable socket disposed about the shank, a spacer disposed about the shank for securing the socket against translational movement during its expansion and means adapted for allowing relative movement between the shank and the socket during expansion of the latter.

BACKGROUND OF THE INVENTION

A wall-plug of the aforenoted type is used more particularly for fixing a heavy object to a support made from a hard material, after the wall-plug has been anchored within a hole previously bored within the material, the object then being disposed against the head of the shank and the edge of the anchorage hole.

The means permitting the relative movement of the shank and the socket, during and/or after expansion, makes possible, if the socket has been moved within its hole during expansion and therefore the shank with it, which frequently happens, a final movement of the shank, with respect to the socket which is then immobilized, for securing the object to be fixed firmly against the edge of the anchorage hole.

These same means also make it possible to overcome flatness deficiencies or thickness variations.

Such a wall-plug is already known from French patent FR-A-2 574 135.

In accordance with the wall-plug of this patent, the means allowing relative movement between the shank and the socket is formed by means of a shearable collar which is integral with the spacer which, after shearing following a predetermined force, allows the spacer to penetrate further into an intermediate ring integral with the socket.

The wall-plug of this patent has the drawback of being expensive to produce.

Still more particularly, document FR-A-2 291 400 teaches a cone expansion wall-plug comprising a shank with, at one end thereof, a truncated cone adapted for being driven in translation by means of the shank for causing expansion of an expansion zone of an expandable socket disposed about the shank, and means for securing the socket against translational movement during its expansion, the socket comprising an axially compressible zone whose internal diameter is equal to that of the expansion zone of the socket for permitting relative movement of the shank and the socket after expansion of the latter.

Because of the provision of the compressible zone of the socket there is no longer any need for provision of an intermediate ring.

The compressible zone of the socket provides a double function: by means of its compression, it makes possible a final movement of the shank with respect to the expansion zone of the socket, after expansion and immobilization thereof; and as a result of having the same internal diameter as that of the expansion zone, it participates with the latter in guiding the shank whose external diameter is substantially equal to the internal diameter of these two zones of the socket.

However, this last mentioned plug is not of simple and economic construction and the wedge effect defined between the cone and the socket is not perfect.

OBJECT OF THE INVENTION

The object of the present invention is to therefore improve this last mentioned type of plug.

SUMMARY OF THE INVENTION

To this end, the present invention relates to a wall-plug of this last mentioned type, characterized by the fact that the socket is formed from a stamped metal sheet blank and its expansion zone is provided with bent lugs forming expansion teeth, the free edges of the expansion teeth and the bending zones of the lugs of the expansion zone forming a truncated cone shaped surface for guiding the expansion cone.

The wedge effect defined between the cone and the socket is caused, in so far as the socket is concerned, first of all by means of the fictitious surface formed, on the one hand, by means of the free edges of the expansion teeth and, on the other hand, by means of the bending zones of the lugs which, incidentally, besides their function of guiding the expansion cone also provide the amount of expansion required. The expansion teeth are therefore, from this point of view, teeth for guiding the expansion cone.

In the preferred embodiment of the wall-plug of the invention, the compressible socket zone is a bellows portion with peripheral corrugations, and in particular, advantageously internal circumferential corrugations.

Still preferably, the end zone of the socket opposite the expansion zone has internal bosses for increasing the apparent or functional thickness of the wall of the socket offered to the spacer and thus improving its bearing surface upon the spacer.

Still preferably, the socket of the wall-plug of the invention comprises slits, advantageously a long one defined between two bent lugs and two adjacent teeth, for providing good flexion during expansion.

The invention will be better understood from the following description of the wall-plug of the invention with reference to the accompanying drawings in which:

DETAILED DESCRIPTION OF THE ILLUSTRATED EMBODIMENT

Figure 1:
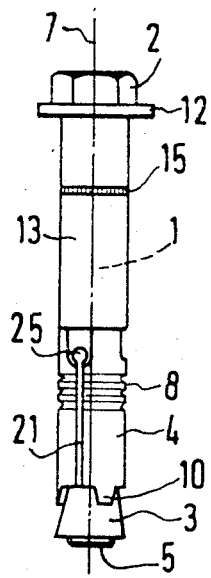
FIG. 1 is a general view of the wall-plug of the present invention.

The wall-plug shown in the drawings comprises a shank, or screw 1 with, at one end thereof, a head 2 and a clamping washer 12 integral with the head and, at the other end thereof, a threaded portion 5 whose thread cooperates with the tapped portion of an expansion cone 3. Throughout the specification, the use of the term "cone" 3 is meant to infer a truncated cone. An expandable socket 4 is disposed about the threaded portion of screw 1.

A spacer 13 bears against washer 12 and is disposed about the unthreaded part of shank 1.

Figure 2:
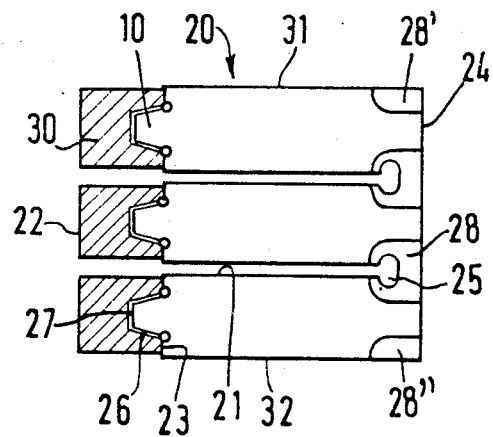
FIG. 2 is a view of the metal sheet blank from which the socket of the wall-plug of FIG. 1 was formed.

The expandable socket 4 comprises, along the axis 7 of the wall-plug, an expansion zone 6, a compressible zone 8 adjacent zone 6 and an end zone 9 adjacent zone 8 and bearing against the spacer 13. Socket 4 has been made from a metal sheet blank 20 (FIG. 2). Within blank 20 two longitudinal expansion slits 21 have been pre-cut so as to extend over a large part of the length of the blank, and have been slightly widened within the region extending from the transverse slit edge 22 of the blank as far as a line 23 called the bending line—it will be explained later why—and ending, close to the non-split transverse edge 24 of the blank at a hole 25 which is provided for preventing, during expansion of the socket and the flexion of the strips of the blank located between the slits, tearing of the blank portion adjacent its non-split transverse edge 24.

From the bending line 23, fine trapezoidal slits 26 have been cut out such that small bases 27, extending parallel to edges 22, 24 of the blank, are disposed substantially closer to the bending line 23 than the slit edge 22. Slits 26 also end, at both ends thereof, along the bending line 23, in non-tear orifices.

By means of a stamping machine there were then formed, on the same side of the blank, and about the non-tear holes 25, bosses 28 at the two free corners of the non-split end 24, semi-bosses 28', 28" and in an intermediate zone between the bending line 23 and holes 25 but closer to these latter, transverse grooves 29, here three in number, which extend parallel to edges 22, 24 (FIG. 3), the bosses and the grooves being obtained by means of displacement of material.

Subsequently, about line 23 on the side of the blank towards which the material of the bosses and of the grooves had been displaced, the end strip portions or lugs 30, external to slits 26, are bent against the noted surface of the blank so as to double its thickness on one side of the bending line and, on the other, free the expansion teeth 10, which have a trapezoidal shape and are three in number.

It will be noted that the depth of grooves 29 is such that the corresponding ribs or corrugations 11, have a thickness which is, in effect, twice that of the original blank and which is substantially equal to its thickness within the zone of the bent lugs 30.

Figure 3:
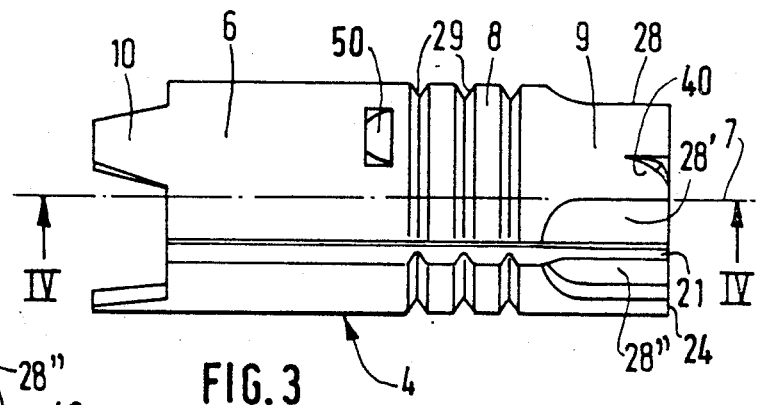
FIG. 3 is a view of the socket of the wall-plug of FIG. 1.

Finally, in a die of appropriate shape, the blank thus precut, stamped and partially bent upon itself is deformed so as to render it cylindrical around axis 7 and bring the longitudinal edges 31, 32 together, but without joining them, or merging them, so as to form a third expansion slit 21, visible in FIG. 3, upon each side of which the semi-bosses 28', 28" form a boss similar to the other two bosses 28.

The recesses formed by widening the slits, close to the slit edge of the socket, after the lugs have been bent back so as to have a width less than that of the strips upon which they are bent back, stop them from preventing suitable cylindrical shaping of the socket within such region.

It will be noted that the cylindrical shape of the socket, stamping of the bosses and formation of the corrugations, after bending of the lugs, can be accomplished within one and the same die.

The compressible zone 8, after shaping of the socket, is a bellows portion with internal circumferential corrugations 11 (FIG. 4), formed by means of ribs corresponding to grooves 29. The internal diameter of the compressible zone 8 is the same as that of the expansion zone 6, with the bent lugs 30.

Figure 5:
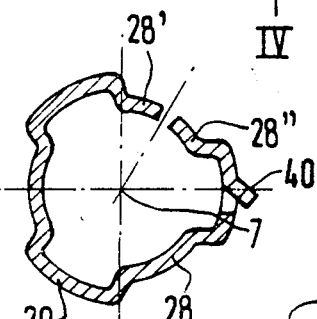
FIG. 5 is a sectional view of a socket along line V—V of FIG. 3.

Within zone 9 of the socket, and within the region of the internal bosses 28, 28', 28", particularly within end plane 24, the socket has (FIG. 5) a dual annular section, a first partial section formed by means of the strip portions 20 situated between bosses 28, 28', 28" and with a first external diameter, and a second partial annular section formed by means of the inwardly displaced portions 28, 28', 28" with a second internal diameter, such that the envelope sleeves of the two groups of portions are substantially radially adjacent and so that the apparent or functional thickness of the socket, in this end plane, is thus twice the thickness of the starting blank.

The internal truncated cone shaped surface, partially fictitious, and formed by means of the envelope of the free edges 14 of teeth 10 and the circular envelope of the bending zones 23 of lugs 30 serves to guide the expansion cone 3 having a complementary external surface.

Having described the structure of the wall-plug, its operation will now be explained.

After boring a receiving or anchorage hole for the wall-plug within a supporting material, the plug is inserted into this hole along with the object to be fixed to the material as far as an annular mark 15 upon spacer 13. The force required for inserting the wall-plug prevents the expandable socket from undergoing rotation. When screw 1 is threadedly rotated, by means of its head 2, cone 3 is inserted into the socket 4 and causes expansion thereof, namely the radial expansion of the portions 20 of the socket extending between slits 21.

If socket 4 initially moves towards the surface during an initial portion of the expansion phase, which is often the case, it takes with it screw 1, because of the presence of spacer 13 against which socket 4 abuts. If the force which the expansion cone 3 exerts upon the expansion zone 6 of socket 4 is passed on to the compressible zone 8, this latter exerts a force upon spacer 13 through means of zone 9. During this expansion phase, the corrugations 11 of the compressible zone 8, because of their relative resilience, at most close up slightly, without being able to speak of true compression of this zone 8.

With socket 4 slightly displaced towards the surface of the supporting material during anchorage, the object to be properly fixed cannot be applied against the material, as it should be. However, subsequently with the wall-plug correctly anchored as a result of continued expansion of zone 6 by means of cone 3, screw 1 is further screwed into cone 3. With cone 3 immobilized, screw 1 will be screwed into the cone while penetrating the anchorage hole. At the beginning of this locking phase, which may also accommodate deficiencies in flatness or thickness variations, the head 2 of screw 1 causes spacer 13 to exert a force against socket 4. At a predetermined time, this force will cause compression of the compressible zone 8 of the socket and screw 1 can fixedly secure the object upon the supporting material.

Within the region of the transverse edge 24 of zone 9 of the socket, within a strip portion 20 situated for instance between one of the bosses 28 and the semi-boss 28", an external lug 40 having the function to prevent relative rotation between the socket and the anchorage hole (FIGS. 3, 5) can also be provided.

Figure 4:
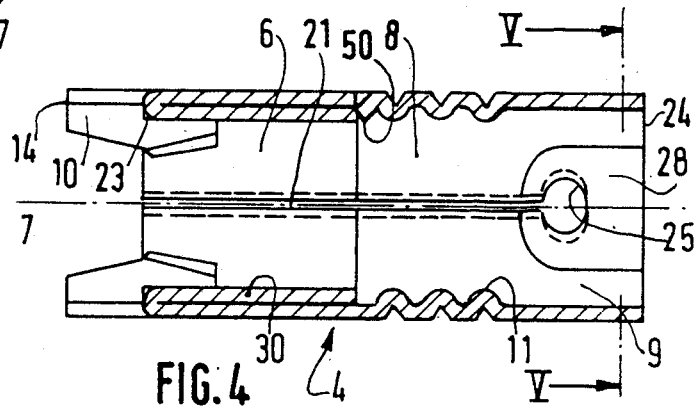
FIG. 4 is a sectional view of the socket along line IV—IV of FIG. 3.

Furthermore, internal lugs 50, within zone 6 of the socket, having the function of a stop means for the bent lugs 30 and for thus avoiding damage thereto by means of the expansion cone 3 can also be provided (FIGS. 3, 4).

Instead of a shank having, at its ends, an external head and a threaded portion for receiving the expansion cone, the wall-plug of the invention could also comprise a shank having, conversely, a threaded portion for receiving an external nut and an expansion cone.

Obviously, many modifications and variations of the present invention are possible in light of the above teachings. It is therefore to be understood that within the scope of the appended claims, the present invention may be practiced otherwise than as specifically described herein.

We claim:

1. A cone expansion wall-plug, comprising:
   a shank having first threaded means defined upon one end portion thereof;
   an expansion cone having second threaded means provided thereon for threaded engagement with said first threaded means of said shank such that when said shank is rotated, said threaded engagement of said first and second threaded means will cause said expansion cone to undergo translational movement relative to said shank; and
   an expandable socket disposed about said shank and including an expansion zone for cooperation with said expansion cone such that when said expansion cone undergoes said translational movement, said expansion cone will cause expansion of said expansion zone of said expandable socket,
   said expandable socket being formed from a sheet metal blank and including means defining a bend line within the region of an end portion thereof which is operatively cooperable with said expansion cone; a plurality of expansion lugs bent about said bend line so as to extend in a first direction relative to said bend line and thereby define said expansion zone within said expandable socket; and a plurality of expansion teeth extending from said bend line in a second direction, relative to said bend line, which is opposite to said first direction in which said expansion lugs extend, such that free end portions of said expansion teeth, located at an axial extremity of said expandable socket, operatively engage said expansion cone for thereby guiding said expansion cone into said expansion zone of said expandable socket as said expansion cone undergoes said translational movement relative to said shank and said expandable socket as a result of said threaded engagement of said first and second threaded means of said shank and said expansion cone.

2. Wall-plug according to claim 1, wherein the end zone (9) of the socket (4), opposite the expansion zone (6), comprises internal bosses (28,28',28") for increasing the apparent thickness thereof.

3. A wall-plug as set forth in claim 1, further comprising:
   an axially compressible zone defined within said expandable socket for permitting relative movement of said shank with respect to said expandable socket after expansion of said expandable socket.

4. Wall-plug according to claim 3, wherein the compressible zone (8) is a bellows portion with peripheral corrugations (11).

5. Wall-plug according to claim 4, wherein the peripheral corrugations are internal circumferential corrugations (11).

6. Wall-plug according to claim 5, wherein the lugs (30) are bent inwardly of the socket (4).

7. A wall-plug as set forth in claim 6, wherein:
   the internal diameter of said circumferential corrugations is substantially the same as the internal diameter of said expansion zone as defined by said inwardly bent expansion lugs.

8. A wall-plug as set forth in claim 1, further comprising:
   head means defined upon said shank at an end portion thereof which is disposed opposite said first threaded means thereof; and
   spacer means interposed between said head means of said shank and said expandable socket for preventing translational movement of said expandable socket relative to said shank during expansion of said expandable socket.

9. A wall-plug as set forth in claim 1, wherein:
   said expansion teeth comprise three expansion teeth equiangularly spaced about the circumferential extent of said expandable socket.

10. A wall-plug as set forth in claim 1, wherein:
    said plurality of expansion lugs comprises three expansion lugs equiangularly spaced about the circumferential extent of said expandable socket.

11. A wall-plug as set forth in claim 1, further comprising:
    axially extending slit means extending from one edge portion of said expandable socket toward the opposite edge portion of said expandable socket for defining expandable portions of said expansion zone.

12. A wall-plug as set forth in claim 11, further comprising:
    aperture means formed at end portions of said slit means within the vicinity of said opposite edge portion of said expandable socket for preventing tearing of non-slit regions of said expandable socket within said vicinity of said opposite edge portion of said expandable socket.

13. A wall-plug as set forth in claim 1, wherein:
    said expansion teeth have the configuration of a trapezoid.

14. A wall-plug as set forth in claim 1, further comprising:
    slit means defined between said expansion teeth and said expansion lugs so as to permit said expansion lugs to be bent, and extend in said first direction, with respect to said expansion teeth; and
    aperture means defined at end portions of said slit means and along said bend line for preventing tearing of non-slit regions of said expandable socket within the vicinity of said bend line.

* * * * *